H. C. LOWE.
Nut-Locks.
No. 142,858.            Patented September 16, 1873.
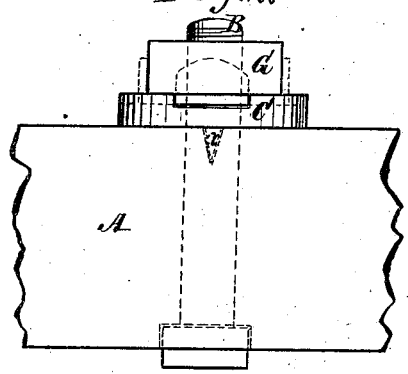
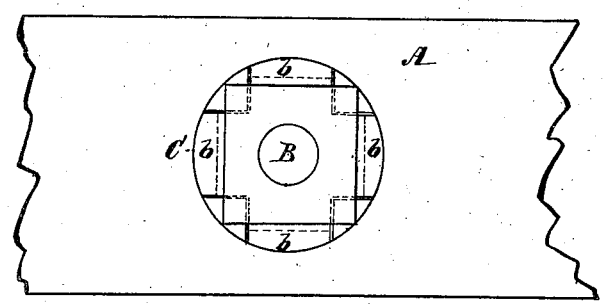
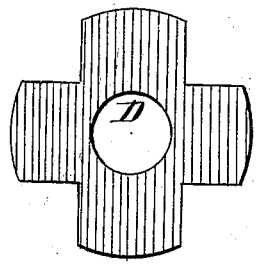
Witnesses:
Chas. A. Pettit
Alfred B. Robertson
Inventor:
H. C. Lowe
Per _____
Attorneys.

UNITED STATES PATENT OFFICE.

HOMARD C. LOWE, OF NORTHEAST, MARYLAND, ASSIGNOR TO HIMSELF AND JOHN B. HALEY, OF SAME PLACE.

IMPROVEMENT IN NUT-LOCKS.

Specification forming part of Letters Patent No. 142,858, dated September 16, 1873; application filed March 15, 1873.

*To all whom it may concern:*

Be it known that I, HOMARD C. LOWE, of Northeast, in the county of Cecil and State of Maryland, have invented a new and Improved Combination Washer and Nut-Lock, of which the following is a specification:

In the drawing, Figure 1 represents a plan view of my combination washer and nut-lock. Fig. 2 is a side elevation of the same; and Fig. 3, a detail view of the washer-cross.

My invention is an improvement in the class of nut-locks in which a metal plate is placed in a suitable recess or groove of the washer of the nut, and its ends bent up against the sides of the latter. The improvement relates to the combination of a washer provided with projections on its under side, and two straight grooves in its face, (the same crossing each other at right angles,) and a sheet-metal locking-plate, whose form is that of a Latin cross, to adapt it to fit in said grooves, and thus form a double lock for the nut, as hereinafter described.

A is the material to which the bolts B are applied. The washers are provided with projections *a*, fitting into corresponding recesses of the wood or iron to which they are applied. I provide the washers at their upper sides with grooves *b*, in the shape of a cross, which admits the metallic cross-piece D, Fig. 3.

To secure the nuts G rigidly to bolts B, two opposite wings of cross-piece, D, are turned up against the side of the nut.

I do not claim a washer provided with projections, nor with grooves to receive a locking-plate; but

I claim—

The combination of the cross-shaped sheet-metal plate D with the correspondingly-grooved washer C, having projections *a a* on its under side, all as shown and described.

HOMARD C. LOWE.

Witnesses:
J. IRVIN WHITE,
C. C. BENJAMIN.